Patented Jan. 9, 1951

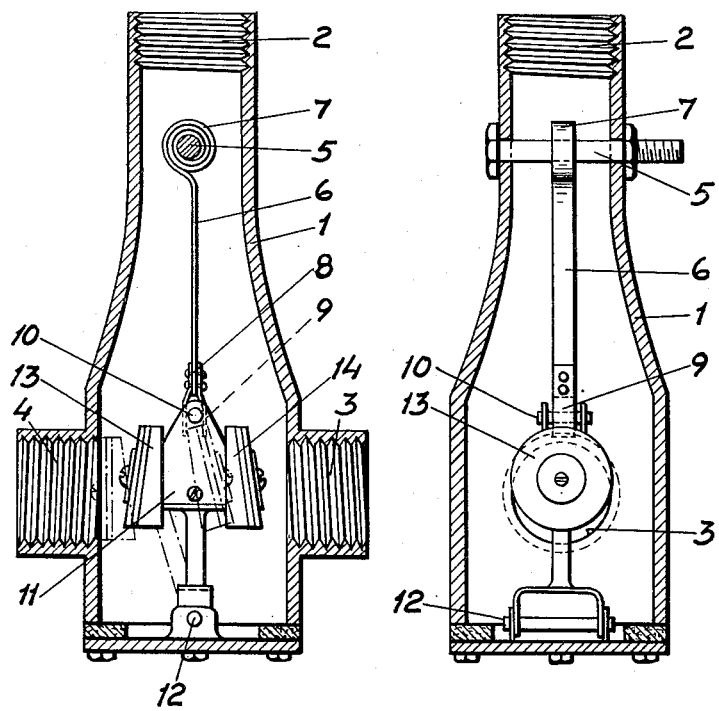

2,537,535

UNITED STATES PATENT OFFICE 2,537,535

SHUNT VALVE

Thorsten Wallentin Larsson, Skelleftea, Sweden

Application June 14, 1948, Serial No. 32,827
In Sweden January 29, 1947

1 Claim. (Cl. 236—12)

The present invention relates to an improvement in automatic shunt valves for heat conduit installations, hot and cold water mixers for showers etc.

According to the invention a bimetal thermostat is arranged in a chamber with two inlets and one outlet, the free end of which thermostat is connected to or engaging a control member provided between the inlets for adjustment of the flow areas of the inlets. The mounting of the bimetal thermostat and its larger part is preferably located in the vicinty of the outlet.

The invention is illustrated through an embodiment on the accompanying drawing, Figs. 1 and 2 being vertical sections in planes perpendicular to each other.

On the drawing 1 indicates a valve chamber with an outlet 2 and symmetrically relatively to same two inlets 3, 4 for f. inst. hot water, and cold water respectively, said inlets being located right opposite each other. A shaft 5, settable in different turning positions, is arranged in the valve chamber in the vicinity of the outlet, which shaft is located in a plane perpendicular to the directions of flow of the inlets. To the shaft 5 there is secured a bimetal thermostat 6 which is forming a coil around the shaft 5 and with its free end 8 extends to the vicinity of the inlets 3, 4 where it is provided with or adapted to a fork 9 enclosing a pin 10 or the like on a control member 11 which by means of a joint 12 is swingably mounted to a removable end plate 12' serving as a closure for the valve chamber 1 and adapted with valve discs 13, 14, said valve discs, when the control member swings on the joint 12, are more or less closing the one inlet and opening the other one, and vice versa. Instead of two valve discs, a mutual valve flap or the like may be provided. Finally, instead of being flexibly mounted to the valve chamber 1, the control member 11 may be rigidly secured to the bimetal thermostat and hang freely in same. The shaft 5 may be provided with a pointer located outside the valve chamber for indication of the angular position of the shaft and therewith the adjustment of the bimetal thermostat and the control member in a normal position.

The device operates as follows: it is supposed that cold water flows in through the inlet 3 and hot water through the inlet 4, and that mixed water flows out through the outlet 2, and that the control member occupies the position shown in full lines. If the temperature of the outgoing mixed water is now increased, the bimetal thermostat will straighten out and the control member 11 will swing anti-clockwise in Fig. 1 around the joint 12, so that the inlet for the hot water will be choked or closed and the inlet 3 for the cold water will open further, and consequently the temperature of the mixed water will fall. Should, on the other hand, the temperature of the mixed water fall below the adjusted value, the control member will swing clockwise and a corresponding action take place.

Having now described my invention, what I claim as new and desire to secure by Letters Patent is:

Shunt valve for controlling the mixture of hot and cold liquids comprising a vertically disposed elongated casing, axially aligned oppositely disposed inlets for hot and cold liquids opening into the sides of the casing spaced from the lower end thereof, an outlet for mixed liquids at the other end thereof, a removable closure plate for the lower end of the casing, an upstanding arm pivotally mounted at the lower end thereof on said removable closure plate, a control head mounted on said arm including oppositely disposed valve disc members adapted to vary the flow of liquid through the respective inlets when the arm is rocked on its pivot, a bimetallic thermostat mounted in said casing adjacent said outlet and including an elongated vertically disposed free end extending toward the control head, a cross pin on the control head and a depending forked terminal part on the free end of said thermostat embracing said pin to impart motion of said thermostat to said control head, whereby said bottom closure with said control head mounted thereon may be handled as a unit in the assembly and disassembly of the valve.

THORSTEN WALLENTIN LARSSON.

REFERENCES CITED

The following references are of record in the file of this patent:

UNITED STATES PATENTS

| Number | Name | Date |
|---|---|---|
| 2,155,154 | Snavely | Apr. 18, 1939 |
| 2,272,403 | Fields | Feb. 10, 1942 |
| 2,287,294 | Coile et al. | June 23, 1942 |
| 2,488,048 | Atkinson et al. | Nov. 15, 1949 |